United States Patent
Grimm et al.

(10) Patent No.: US 10,153,093 B2
(45) Date of Patent: Dec. 11, 2018

(54) ULTRA COMPACT MICRO CAPACITOR AND METHOD FOR PRODUCING SAME

(71) Applicants: LEIBNIZ-INSTITUT FUER FESTKOERPER-UND WERKSTOFFFORSHUNG DRESDEN E.V., Dresden (DE); MURATA MANUFACTURING CO., LTD., Kyoto-fu (JP)

(72) Inventors: Daniel Grimm, Dresden (DE); Martin Bauer, Dresden (DE); Oliver G. Schmidt, Dresden (DE); Shoichiro Suzuki, Kyoto-fu (JP)

(73) Assignees: LEIBNIZ-INSTITUT FUER FESTKOERPER-UND WERKSTOFFORSCHUNG DRESDEN E.V., Dresden (DE); MURATA MANUFACTURING CO., LTD., Kyoto-Fu (JP)

( * ) Notice: Subject to any disclaimer, the term of this patent is extended or adjusted under 35 U.S.C. 154(b) by 0 days.

(21) Appl. No.: 15/524,461

(22) PCT Filed: Nov. 5, 2015

(86) PCT No.: PCT/EP2015/075822
§ 371 (c)(1),
(2) Date: Jul. 31, 2017

(87) PCT Pub. No.: WO2016/071450
PCT Pub. Date: May 12, 2016

(65) Prior Publication Data
US 2017/0358394 A1 Dec. 14, 2017

(30) Foreign Application Priority Data
Nov. 5, 2014 (DE) .................. 10 2014 222 535

(51) Int. Cl.
| H01G 4/32 | (2006.01) |
| H01G 4/33 | (2006.01) |
| H01G 4/30 | (2006.01) |
| H01G 4/10 | (2006.01) |
| H01G 4/12 | (2006.01) |

(52) U.S. Cl.
CPC .................. *H01G 4/32* (2013.01); *H01G 4/10* (2013.01); *H01G 4/1272* (2013.01); *H01G 4/30* (2013.01); *H01G 4/308* (2013.01)

(58) Field of Classification Search
CPC .............. H01G 4/32; H01G 4/00; H01G 4/14
USPC ...................................................... 361/301.5
See application file for complete search history.

(56) References Cited

U.S. PATENT DOCUMENTS

| 4,318,975 A | 3/1982 | Kuznetsov et al. |
| 2005/0118733 A1 | 6/2005 | Schmidt et al. |

FOREIGN PATENT DOCUMENTS

| DE | 10159415 | 6/2003 |
| EP | 2023357 | 2/2009 |
| WO | 2010/129319 | 11/2010 |

OTHER PUBLICATIONS

Sharma et al., "Large-Area Rolled-up Nanomembrane Capacitor Arrays for Electrostatic Energy Storage," *Adv. Energy.Materials.*, 4, 1301631, 2014, pp. 1-25.
Bufon et al., "Self-Assembled Ultra-Compact Energy Storage Elements Based on Hybrid Nanomembranes", Nano Letters, American Chemical Society, US; Engineering Information, Inc., vol. 10, No. 7, Jul. 14, 2010, pp. 2506-2510.
Linder et al., "Water-Soluble Sacrificial Layers for Surface Micromachining", Small., vol. 1, No. 7, Jul. 1, 2005, pp. 730-736.

*Primary Examiner* — Eric W Thomas
(74) *Attorney, Agent, or Firm* — Greenblum & Bernstein, P.L.C.

(57) ABSTRACT

The present invention relates to the area of micro- and nanoelectronics and relates to ultra-compact micro capacitors, how they can be used, for example, in electrical and electronic devices. The object of the present invention consists in specifying an ultra-compact micro capacitor with the highest capacity. The problem is solved by an ultra-compact micro capacitor which is made from a rolled-up layer stack of alternatingly arranged layers of dielectric and/or electrically insulating and electrically conductive materials with rolled-up lengths of the layer stack of at least 1 mm, and an absolute electrical storage capacity of at least 10 nF. The problem is additionally solved by a method, in which a layer containing a water-soluble cellulose derivative is applied to a substrate and a layer stack to same, the layer containing the cellulose derivative is removed from the substrate using water, an organic solvent and/or an organic solvent mixture, and the layer stack is rolled up with a rolling speed of more than 0.1 mm/min.

18 Claims, No Drawings

ULTRA COMPACT MICRO CAPACITOR AND METHOD FOR PRODUCING SAME

The present invention pertains to the fields of physics, materials sciences and micro- and nanoelectronics and relates to ultra-compact microcapacitors as can be used, for example, in electrical and electronic devices, and to a method for the production of said ultra-compact microcapacitors.

Our electronically mobile society constantly demands new achievements/improvements so that ultra-compact integrative components for mobile use can be used comfortably on the go. Capacitors can be found in virtually every electrical and electronic device.

For the electrical capacitance of a capacitor, the area of the electrically conductive layer is important. The larger this area is, the greater the electrical capacitance.

However, it must thereby be kept in mind that capacitors are built into electrical or electronic devices as electrical components. The installation area necessary for this should therefore be as small as possible. The smaller this installation area is, the more compactly the electrical or electronic device can be built.

For this purpose, developments have recently been focused on miniaturization in microelectronics, in particular on reducing the size of transistors and selectively passive elements, such as inductors or capacitors [R. Sharma et al., Adv. Energy Mater., 2014, 4, 1301631].

In roll-up technology, layers are applied to a substrate and subsequently rolled up. The rolling-up mechanism can be achieved by an application of the layers in a tensioned state and a subsequent release, or by an application and subsequent removal of a sacrificial layer.

According to WO 2010/129319 A2, plasma or wet-chemical etching of a silicon substrate is known so that the tensioned two-dimensional structure structured thereupon is rolled up and formed into a three-dimensional structure.

According to Bufon, layer structures that are arranged on a sacrificial layer and rolled up by removal of the sacrificial layer are also known. The speed at which the sacrificial layer can be undercut and the tensioned layer separated from the substrate is thereby maximally 100 µm/h [C. C. B. Bufon et al., Nano Letters, 2010, 10, 2506-2510].

Also, according to EP 2 023 357 A1, a method for the production of capacitors is known in which a layer structure is rolled up by oxidation of a sacrificial layer. A hydrogel can also be used as a lower part of the layer structure, which hydrogel is placed in contact with water, thereby absorbs the water, swells up, and causes the rolling-up of the layer stack.

According to DE 101 59 415 A1, the production of micro- and nanoscopic coils, transformers and capacitors by a rolling-up or folding-down of conductive layers during the removal of auxiliary layers from a substrate is known. To do so, an auxiliary layer that was previously applied between a conductor track and a substrate is removed from the substrate, and the conductor track is rolled up as a result. Germanium is thereby used as an auxiliary layer. Ge is also used as a sacrificial layer according to Sharma, and this layer is removed by means of a wet etching solution, 2% $H_2O_2$ [R. Sharma et al., Adv. Energy Mater., 2014, 4, 1301631].

A disadvantage of the known prior art is that the production of rolled-up capacitors requires a comparatively long length of time for the rolling-up process. Particularly since the removal of the materials used for the sacrificial layer must take place by means of etching. Diluted hydrogen peroxide, which is hazardous to human skin and is a bleaching agent, is used as an etchant, for example. During longer acting times, it has a corrosive effect on metal layers and is therefore a significant disadvantage for long rolling times.

Also disadvantageous is the large installation area required for capacitors and the thereby not yet sufficient capacitance of capacitors.

The object of the present invention is the specification of an ultra-compact microcapacitor with a highest possible capacitance, and the specification of a cost-effective, environmentally friendly and time-saving method for the production of an ultra-compact microcapacitor of this type.

The object is attained by the invention disclosed in the claims. Advantageous embodiments are the subject matter of the dependent claims.

The ultra-compact microcapacitor according to the invention is composed of a rolled-up layer stack of alternatingly arranged layers of dielectric and/or electrically insulating and electrically conductive materials having rolling-up lengths for the layer stack of at least 1 mm and an absolute electrical storage capacity of at least 10 nF.

Advantageously, the capacitor has an absolute electrical storage capacity between 0.05 and 1 µF.

Likewise advantageously, the rolled-up layer stack has dimensions of 10 to 100 µm in diameter.

Further advantageously, rolling-up lengths for the layer stack of 1 to 30 mm are present.

It is also advantageous if the layer stack comprises a layer of at least one dielectric and/or electrically insulating material, a layer of at least one first electrically conductive material, an additional layer of at least one dielectric and/or electrically insulating material, and a layer of at least one second electrically conductive material, and in which layer stack the layers of the dielectric and/or electrically insulating material essentially completely cover the layers of the electrically conductive material, wherein even more advantageously, additional layers of the dielectric and/or electrically insulating material and layers of the electrically conductive material are arranged alternatingly one on top of the other.

In the method according to the invention for the production of an ultra-compact microcapacitor, at least one layer containing a water-soluble cellulose derivate and/or one layer containing a water-soluble polymer is applied to a substrate;

on which layer a layer of at least one dielectric and/or electrically insulating material is arranged, on which a layer of at least one first electrically conductive material is arranged, on which a layer of at least one dielectric and/or electrically insulating material is arranged, on which a layer of at least one second electrically conductive material is arranged, and on which a layer of at least one dielectric and/or electrically insulating material is arranged;

wherein the layers of the dielectric and/or electrically insulating material are applied such that they essentially completely cover the layers of the electrically conductive material;

and wherein subsequently the layer containing a water-soluble cellulose derivate and/or the layer containing a water-soluble polymer is essentially completely removed from the substrate by means of water and/or an organic solvent and/or an organic solvent mixture; and the layer stack is rolled up at a rolling-up speed of more than 0.1 mm/min.

Advantageously, additional layers of the dielectric and/or electrically insulating material and layers of the electrically conductive material are applied alternatingly one on top of the other.

Likewise advantageously, methylcellulose is used as a water-soluble cellulose derivative.

And also advantageously, polyvinyl alcohol and/or polyacrylic acid are used as a water-soluble polymer.

Further advantageously, before the removal of the layer containing a water-soluble cellulose derivative and/or the layer containing a water-soluble polymer from the substrate, the other layer materials of the layer stack are partially removed at least on one partial region of this layer, wherein even more advantageously, the partial removal of the layer materials of the layer stack is carried out by means of an HF solution or a diluted HF solution or mechanically.

It is also advantageous if the removal of the layer containing a water-soluble cellulose derivative and/or the layer containing a water-soluble polymer is carried out by means of water.

It is likewise advantageous if $AlO_x$, advantageously $Al_2O_3$, $SiO_x$, advantageously $SiO_2$, $AlTiO_x$, $SiTiO_x$, $HfO_x$, $TaO_x$, $ZrO_x$, $HfSiO_x$, $ZrSiO_x$, $TiZrO_x$, $TiZrWO_x$, $TiO_x$, $SrTiO_x$, $PbTiO_x$, $SiAlO_x$, metal nitrides, aluminum nitrides $AlN_y$, silicon nitrides $SiN_y$, $AlScN_y$, metal oxynitrides, aluminum oxynitrides $AlO_xN_y$, silicon oxynitrides $SiO_xN_y$, $HfSiO_xN_y$, and/or $SiC_zO_xN_y$ are used as a dielectric and/or insulating layer.

It is further advantageous if the dielectric and/or insulating layers are applied by means of atomic layer deposition and/or chemical vapor deposition.

It is also advantageous if ethanol is used as an organic solvent.

And it is also advantageous if the rolling-up speed achieved is between 0.1 and 5 mm/min.

With the solution according to the invention, it is for the first time possible to specify microcapacitors that are ultra-compact, thereby having a high capacitance and being produced using a method that is cost-effective, environmentally friendly, time-saving, and material-sparing.

This is achieved by ultra-compact microcapacitors that are composed of a rolled-up layer stack of alternatingly arranged layers of dielectric and/or electrically insulating and electrically conductive materials with rolling-up lengths for the layer stack of 0.5 mm to 30 mm. Because of the large rolling-up lengths, the ultra-compact microcapacitors according to the invention achieve an absolute electrical storage capacity of at least 50 nF.

The ultra-compact microcapacitors according to the invention can, thanks to their rolled-up design, be arranged on a very small installation area on an electronic or electrical component, and thus have a comparatively high electrical storage capacity per $cm^2$ of installation area.

Within the scope of this invention, capacitors of a micro- or nanoscale magnitude that have a large absolute electrical storage capacity with a simultaneously small installation area are to be considered ultra-compact microcapacitors. The installation area is, according to the invention, the necessary area on an electrical or electronic component, for example, on a printed circuit board in an electrical or electronic device, on which the microcapacitor is arranged.

The ultra-compact microcapacitors according to the invention are, according to the invention, produced in a cost-effective, environmentally friendly, time-saving and material-sparing manner by means of a method in which at least one layer containing a water-soluble cellulose derivative and/or one layer containing a water-soluble polymer is applied to a substrate as a sacrificial layer. On this sacrificial layer, the layer stack comprising a layer of at least one dielectric and/or electrically insulating material, a layer of at least one first electrically conductive material, a layer of at least one dielectric and/or electrically insulating material, a layer of at least one second electrically conductive material, and a layer of at least one dielectric and/or electrically insulating material is arranged. These layers are applied one on top of the other such that they cover one another essentially as completely as possible, that is, completely.

The sacrificial layer is subsequently essentially completely or completely removed from the substrate by means of water and/or an organic solvent and/or an organic solvent mixture, and the layer stack is rolled up at a rolling-up speed of at least or greater than 0.1 mm/min.

With the specific choice of sacrificial layer, an extraordinarily high rolling-up speed is achieved. The layers are rolled up from the substrate by removal of the sacrificial layer using water and/or an organic solvent or an organic solvent mixture. The special advantage of the invention is that no highly corrosive etchant needs to be used for the removal of the sacrificial layer, but rather either a very small amount of water or very small amount of extremely highly diluted solvent/solvent mixture (in the range of mL/L of water/organic solvent) is used, and that the rolling-up of the layers is initiated in this manner.

According to the invention, it is furthermore advantageous if, before the removal of the sacrificial layer containing a water-soluble cellulose derivative and/or the sacrificial layer containing a water-soluble polymer from the substrate, the other layer materials of the layer stack are partially removed at least on one partial region of this layer, for example, mechanically or by an application of an HF solution or a diluted HF solution to the specific site, and if access by the rolling medium water and/or the organic solvent and/or the organic solvent mixture to the sacrificial layer is thus ensured.

Through the use of essentially water or aqueous solvent mixtures as a rolling medium, the method can on the one hand be carried out in a cost-effective, environmentally friendly, time-saving and material-sparing manner, and extremely high rolling-up speeds can surprisingly be achieved.

The deposition of the layers preferably takes place by means of atomic layer deposition (ALD), chemical vapor deposition (CVD) or physical vapor deposition.

The invention is explained below in greater detail with the aid of an exemplary embodiment.

EXAMPLE

For the production of an ultra-compact microcapacitor having a length of 20 mm and a width of 0.8 mm, a layer of methylcellulose at a concentration of 1 mg/mL water is spun in a completely covering manner onto a silicon substrate having a 1-µm thick thermal silicon dioxide layer in a centrifuge at a rotational speed of 4500 rpm, and is subsequently baked and dried on a hot plate for 5 minutes at 120° C. This methylcellulose layer with a thickness typically less than 5 nm is the sacrificial layer. Then, using the method of atomic layer deposition, an 11-nm thick $Al_2O_3$ layer is deposited at 150° C. such that it completely covers the methylcellulose layer. This $Al_2O_3$ layer, which acts as a dielectric, also serves as an insulation layer between the two metallic electrodes following the rolling-up and as protection for the sacrificial layer against the subsequent process steps and air humidity.

With the aid of optical photolithography, the first electrode of the capacitor is deposited as one tensioned electrically conductive layer each composed of 15 nm Ti and subsequently 20 nm Cr by means of electron beam evaporation at a rate of 0.1 nm/s in each case.

Then, a second 11-nm thick $Al_2O_3$ layer is once again deposited by means of atomic layer deposition at 150° C. such that it completely covers the electrically conductive layers.

After optical lithography for the second electrode, the deposition of the second electrically conductive layer of 10 nm Cr takes place at a rate of 0.1 nm/s.

Finally, again using optical lithography, a region across the entire width of the layer stack is marked at one of the narrow ends, in which region the oxide covering the layer stack is removed with reactive-ion etching for 5 min. An RF power of 200 W is thereby applied, with a gas flow of 34 sccm (sccm=standard $cm^3$/min) $CF_4$ and 16 sccm $CHF_3$ at a process pressure of 6 Pa and a substrate temperature of 35° C.

Water is subsequently applied to the now exposed sacrificial layer, whereby the layer of methylcellulose is dissolved, and the tensioned layer stack is rolled up at a speed of 2 mm/min.

An ultra-compact microcapacitor produced in such a manner has, as a rolled up layer stack, a diameter of 80 μm and thereby an absolute electrical storage capacity of 0.2 μF with a footprint of 800×80 $μm^2$.

The invention claimed is:

1. An ultra-compact microcapacitor comprising a rolled-up layer stack of alternatingly arranged layers of dielectric and/or electrically insulating materials and electrically conductive materials having rolling-up lengths for the rolled-up layer stack of at least 1.0 mm and an absolute electrical storage capacity of at least 10 nF.

2. The ultra-compact microcapacitor according to claim 1, wherein the ultra-compact microcapacitor has an absolute electrical storage capacity between 0.05 and 1 μF.

3. The ultra-compact microcapacitor according to claim 1, wherein the rolled-up layer stack has a diameter of from 10 to 100 μm.

4. The ultra-compact microcapacitor according to claim 1, wherein rolling-up lengths for the rolled-up layer stack are 1 to 30 mm.

5. The ultra-compact microcapacitor according to claim 1, wherein the layer stack comprises a layer of at least one dielectric and/or electrically insulating material, a layer of at least one first electrically conductive material, an additional layer of at least one dielectric and/or electrically insulating material, and a layer of at least one second electrically conductive material, and in which layer stack the layers of the dielectric and/or electrically insulating material essentially completely cover the layers of the electrically conductive material.

6. The ultra-compact microcapacitor according to claim 5 wherein additional layers of the dielectric and/or electrically insulating material and layers of the electrically conductive material are arranged alternatingly one on top of the other.

7. A method for the production of an ultra-compact microcapacitor comprising applying at least one layer containing a water-soluble cellulose derivate and/or one layer containing a water-soluble polymer to a substrate; on which layer a layer of at least one dielectric and/or electrically insulating material is arranged, on which a layer of at least one first electrically conductive material is arranged, on which a layer of at least one dielectric and/or electrically insulating material is arranged, on which a layer of at least one second electrically conductive material is arranged, and on which a layer of at least one dielectric and/or electrically insulating material is arranged;

wherein the layers of the dielectric and/or electrically insulating material are applied such that they essentially completely cover the layers of the electrically conductive material;

and wherein subsequently the layer containing a water-soluble cellulose derivate and/or the layer containing a water-soluble polymer is essentially completely removed from the substrate by means of water and/or an organic solvent and/or an organic solvent mixture; and the layer stack is rolled up at a rolling-up speed of more than 0.1 mm/min.

8. The method according to claim 7 wherein additional layers of the dielectric and/or electrically insulating material and layers of the electrically conductive material are arranged alternatingly one on top of the other.

9. The method according to claim 7 wherein methylcellulose is used as a water-soluble cellulose derivate.

10. The method according to claim 7 wherein polyvinyl alcohol and/or polyacrylic acid are used as a water-soluble polymer.

11. The method according to claim 7 wherein, before the removal of the layer containing a water-soluble cellulose derivate and/or the layer containing a water-soluble polymer from the substrate, the other layer materials of the layer stack are partially removed at least on one partial region of this layer.

12. The method according to claim 11 wherein the partial removal of the layer materials of the layer stack is carried out by means of an HF solution or a diluted HF solution or mechanically.

13. The method according to claim 7 wherein the removal of the layer containing a water-soluble cellulose derivate and/or the layer containing a water-soluble polymer is carried out by means of water.

14. The method according to claim 7, wherein the dielectric and/or insulating layer comprises at least one of $Al_2O_3$, $SiO_2$, $AlTiO_x$, $SiTiO_x$, $HfO_x$, $TaO_x$, $ZrO_x$, $HfSiO_x$, $ZrSiO_x$, $TiZrO_x$, $TiZrWO_x$, $TiO_x$, $SrTiO_x$, $PbTiO_x$, $SiAlO_x$, a metal nitride, a silicon nitride, $AlScN_y$, a metal oxynitride, a silicon oxynitride $HfSiO_xN_y$ or $SiC_zO_xN_y$.

15. The method according to claim 7 wherein the dielectric and/or insulating layers are applied by means of atomic layer deposition and/or chemical vapor deposition.

16. The method according to claim 7 wherein ethanol is used as an organic solvent.

17. The method according to claim 7 wherein the rolling-up speed achieved is between 0.1 and 5 mm/min.

18. The method according to claim 7 wherein the dielectric and/or insulating layer comprises at least one of $AlO_x$, $SiO_x$, $AlN_y$, $SiN_y$, $AlO_xN_y$, or $SiO_xN_y$.

* * * * *